(No Model.)
B. F. BENNETT.
SELF ADJUSTING FULCRUM LEVER WRENCH.
No. 296,721. Patented Apr. 15, 1884.
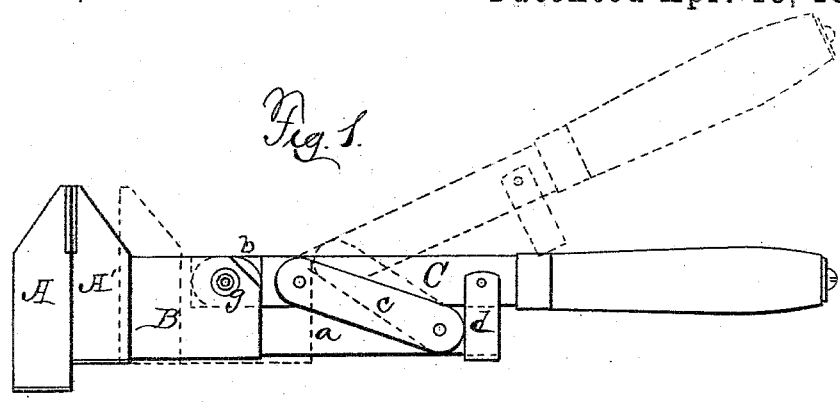
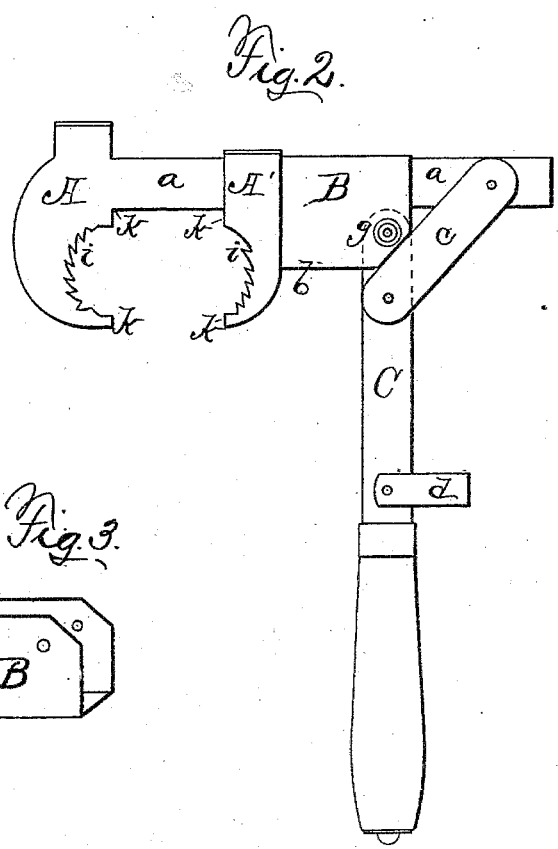
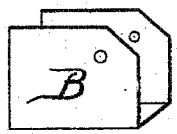
Witnesses:
T. H. Parsons.
J. R. Drake.
Benj. F. Bennett,
Inventor, by
J. R. Drake,
Atty.

UNITED STATES PATENT OFFICE.

BENJAMIN F. BENNETT, OF LOCKPORT, NEW YORK.

SELF-ADJUSTING FULCRUM-LEVER WRENCH.

SPECIFICATION forming part of Letters Patent No. 296,721, dated April 15, 1884.

Application filed September 8, 1883. (No model.)

*To all whom it may concern:*

Be it known that I, BENJAMIN F. BENNETT, a citizen of the United States, residing at Lockport, in the county of Niagara and State of New York, have invented certain new and useful Improvements in a Self-Adjusting Fulcrum-Lever Wrench, of which the following is a specification, reference being had therein to the accompanying drawings.

This invention relates to arranging the two bars of a wrench so as to get, by hinging the handle to the movable bar, a leverage action on the bar and its jaw, the effect being that all strength exerted thereon will squeeze the nut or other object in the jaws tighter according to the force applied, and making thereby the jaws self-adjusting to any sized nut, &c., to be wrenched; and the invention consists in its construction, as fully hereinafter explained.

In the drawings, Figure 1 is a side elevation of the device, the jaws closed, dotted lines showing the wrench partly open; Fig. 2, a side elevation, the handle at complete right angles to the bar, and the jaws with rounded openings and teeth; Fig. 3, a detail of the plate, and Fig. 4 a detail of clasp.

A A' represent the two jaws, the latter sliding on main bar $a$, and having short bar $b$ attached. It is kept in place by a metallic plate, B, forming a bottom and two sides, extending from under the lower edge of main bar $a$ to upper edge of short bar, and fastened thereto, thus confining the sliding bar to the main bar, but allowing it to slide therein. On the end of the sliding bar is hinged or jointed, in any suitable manner, at $g$, the handle-bar C, which acts as a lever-bar, and when closed has the appearance of a continuous long bar. It is kept in position, when the handle-bar is thrown out at the angle required by the nut inclosed in the jaws, by two metallic braces, $c$ $c$—one each side—attached to the lever-bar by a single bolt or pivot, and the other ends to the main bar also by a single pivot or bolt, which allow a free movement of these braces when the lever-handle C is opened out. Thus these braces constitute a fulcrum upon the lever-bars and a base of power upon the rear portion of the main bar. When the handle is in its normal position, a metallic loop, $d$, which is pivoted through by a single rivet (or bolt) onto the handle-bar, is swung over the rear end of the main-bar $a$, and thus holds the two closely together, as in Fig. 1. These simple devices make a self-adjusting fulcrum-lever wrench.

Any suitable jaws may be used with this wrench; but I make jaws having their inner faces hollowed or rounded out, and provided with teeth $i$ $i$, those in the sliding jaw pitching toward the main bar, and those in the outer jaw, $i'$ $i'$, pointing from the main bar, as shown in Fig. 2. This is for the purpose of taking hold of and turning round burrs, gas-pipe, &c. These jaws also maintain a straight line from top to bottom of the inner surface, except the portion hollowed out, so that they will also take hold of square nuts, &c., as well as round surfaces; and when closed the flat faces $k$ $k$ of both jaws come as closely together as though there were no circular openings therein. This gives a double use to a single wrench.

The operation of this wrench is simple and powerful. It adjusts itself instantly to any sized nut within the capacity of the jaws, and all force exerted on the lever-handle not only tends to turn the nut, but compresses the sliding jaw against the nut.

I claim—

1. In combination with the jaws of a wrench and a main bar, $a$, the short or sliding bar $b$, having attached to its rear end the movable lever-handle bar C, and with the fulcrum side braces, $c$, all arranged and operating substantially as specified.

2. In a wrench, the combination of the jaws, long bar $a$, short movable bar $b$, with jointed handle-bar C, plate B, metallic fulcrum side braces, $c$ $c$, and loop $d$, all arranged and operating substantially as specified.

In testimony whereof I affix my signature in presence of two witnesses.

BENJAMIN F. BENNETT.

Witnesses:
J. R. DRAKE,
GEO. A. BURNETT.